United States Patent
McInturff

(10) Patent No.: US 10,766,302 B1
(45) Date of Patent: Sep. 8, 2020

(54) PERSONAL VEHICLE WHEEL MOUNT AND KIT AND METHODS AND USES THEREOF

(71) Applicant: eBoardStuff, San Luis Obispo, CA (US)

(72) Inventor: Richard Alexander McInturff, San Luis Obispo, CA (US)

(73) Assignee: eBoardStuff, San Luis Obispo, CA (US)

( * ) Notice: Subject to any disclaimer, the term of this patent is extended or adjusted under 35 U.S.C. 154(b) by 0 days.

(21) Appl. No.: 16/668,216

(22) Filed: Oct. 30, 2019

(51) Int. Cl.
| B60B 30/08 | (2006.01) |
| B60K 7/00 | (2006.01) |
| A63C 17/00 | (2006.01) |
| A63C 17/12 | (2006.01) |
| B60B 3/00 | (2006.01) |

(52) U.S. Cl.
CPC .......... *B60B 30/08* (2013.01); *A63C 17/0013* (2013.01); *A63C 17/12* (2013.01); *B60B 3/008* (2013.01); *B60K 7/0007* (2013.01)

(58) Field of Classification Search
CPC ......... B60B 30/08; B60B 3/001; B60B 3/008; B60B 3/14; B60B 3/142; B60B 3/147; B60B 3/16; A63C 17/0013; A63C 17/12; B60K 7/0007
USPC .............. 157/14; 301/35.621, 35.63, 35.626, 301/35.631, 35.632, 111.01, 114
See application file for complete search history.

(56) References Cited

U.S. PATENT DOCUMENTS

| 3,494,669 | A | * | 2/1970 | Reppert | ..................... B60B 3/14 |
| | | | | | 301/35.629 |
| 4,143,728 | A | | 3/1979 | Shiber | |
| 5,174,032 | A | * | 12/1992 | Beck | .................... G01B 5/0025 |
| | | | | | 33/203 |
| 5,310,202 | A | | 5/1994 | Goodspeed | |
| 5,381,870 | A | | 1/1995 | Kaufman | |
| 6,041,471 | A | | 3/2000 | Charky et al. | |
| 6,074,271 | A | | 6/2000 | Derrah | |
| 6,752,229 | B2 | | 6/2004 | Ho | |
| 6,848,527 | B2 | | 2/2005 | Nelson | |
| 7,104,558 | B1 | | 9/2006 | Saldana | |
| 7,293,622 | B1 | | 11/2007 | Spital | |
| 8,061,725 | B1 | | 11/2011 | Hawkins | |
| 8,306,673 | B1 | | 11/2012 | Manning | |
| 9,004,213 | B2 | | 4/2015 | Larson et al. | |
| 9,050,540 | B1 | | 6/2015 | Norman et al. | |

(Continued)

OTHER PUBLICATIONS https://www.youtube.com/watch?v=TPFPTmoa1Ws.
https://www.youtube.com/watch?v=8RmQfdMpxBw.
https://www.youtube.com/watch?v=TvQ6KF0iOPI.

*Primary Examiner* — Hadi Shakeri
(74) *Attorney, Agent, or Firm* — UltimatEdge IP Law Group, P.C.; Dean G. Stathakis

(57) ABSTRACT

The present specification discloses wheel mounts for personal vehicles, such as skateboards and scooters. Wheel mount embodiments disclosed herein provide for the interchangeable mounting of wheels having differently shaped wheel cores. The present invention allows users to forego the previous limitation of having a specific wheel mount that only provides for the mounting a specific wheel having one specific wheel core geometry. Embodiments can be utilized on motorized personal vehicles, such as motorized skateboards and scooters that utilize various motors, such as direct drive or belt drive motors.

21 Claims, 12 Drawing Sheets

(56) References Cited

U.S. PATENT DOCUMENTS

| | | |
|---|---|---|
| 9,289,694 B2 | 3/2016 | Norman et al. |
| 9,387,388 B2 | 7/2016 | King |
| 9,499,008 B2 * | 11/2016 | Bohrmann ................ B60B 5/02 |
| 9,610,804 B2 * | 4/2017 | Sotgiu ..................... B60B 30/06 |
| 9,950,244 B1 | 4/2018 | Sargis |
| 10,245,936 B2 | 4/2019 | Gillett |
| 2020/0016928 A1 * | 1/2020 | Rovito ..................... B60B 3/02 |

* cited by examiner

PERSONAL VEHICLE WHEEL MOUNT AND KIT AND METHODS AND USES THEREOF

FIELD

The present disclosure generally relates to skateboards and similar personal vehicles and more specifically relates to wheel mounts and wheel mount kits for same.

BACKGROUND

Over the past several years, motorized personal vehicles have become quite ubiquitous. Exemplary motorized personal vehicles include bicycles, scooters and skateboards. In particular, skateboards have gained tremendous popularity, not only as recreational vehicles but also as genuine modes of commuter transportation. More recently, electric motorized skateboards have become popular. Such skateboards are typically powered by a DC battery powered motor mounted to the underside of a skateboard deck. An output shaft is mechanically linked to a selected one or both of the rear pair of wheels. Control of the motor is provided by a handheld input device that is configured to generate an input for forward and, in some examples, a reverse acceleration signal for transmission to an on-board controller through a wired or wireless connection. The handheld input device may include a trigger-like actuator that may be used for generating the input acceleration signal that results in the energizing of the electric motor for desired forward or rearward movement of the skateboard. Discussions relating to exemplary motorized personal vehicles can be found in U.S. Pat. Nos. 8,061,725; 9,004,213; 9,387,388; 9,950,244; and 10,245,936, all of which are herein incorporated by reference in their entireties.

One aspect of these personal vehicles that greatly affects the quality or enjoyment of a user's ride are the wheels. Various wheel characteristics, such as wheel size and hardness, play an important part of the "feel" of the ride experienced by a user, not to mention that particular surfaces upon which the wheels roll lend themselves to particular wheel types and sizes. The wheels of a skateboard are commonly made of polyurethane and come in many different sizes and shapes to suit different styles of skating. Larger diameter wheels (55 mm to 85 mm or 2.17 inches to 3.35 inches) roll faster and move more easily over cracks in pavement and are better for transition skateboarding. Smaller diameter wheels (48 mm to 54 mm or 1.89 inches to 2.13 inches) keep the board closer to the ground, require less force to accelerate and produce a lower center of gravity which allows for a better response time, but also make for a slower top speed. Wheels also are available in a variety of hardnesses usually measured on the Shore durometer "A" scale. Wheels range from the very soft (about Shore A 75) to the very hard (about Shore A 101). As the A scale stops at 100, any wheels labeled 101A or higher are harder, but do not use the appropriate durometer scale. Some wheel manufacturers now use the "B" or "D" scales, which have a larger and more accurate range of hardness. Modern street skaters typically prefer medium-sized wheels (usually 51 mm to 54 mm or 2.01 inches to 2.13 inches), as small wheels with lighter trucks (the front and rear axle assemblies that connect the wheels to the deck and provide the turning capabilities for the board) can make tricks like kickflips and other flip tricks easier by keeping the center of gravity of the skateboard closer to the deck, thus making the deck easier to spin. Street wheels are harder (A 100/A 101). Vertical ramp or "vert" skating requires larger wheels (usually 55 mm to 65 mm or 2.17 inches to 2.56 inches), as it involves higher speeds. Vert wheels are also usually slightly softer (A 98/A 99), allowing them to maintain high speed on ramps without sliding. Slalom skating requires even larger wheels (60 mm to 75 mm or 2.36 inches to 2.95 inches) to sustain the highest speeds possible. They also need to be soft and have better grip to make the tight and frequent turns in slalom racing. Even larger wheels may be used in longboarding and downhill skateboarding. Modern wheel sizes generally range from 60 mm to 100 mm (2.36 inches to 3.94 inches). These extreme sizes of wheels almost always have wheel cores of hard plastic that can be made thinner and lighter than a solid polyurethane wheel.

Motorized personal vehicles, such as motorized skateboards and scooters, can utilize a wheel mount onto which a wheel, having a desired shape, size and hardness, is mounted. Wheels consists of two parts: the wheel core and the pour. The name "pour" comes from the manufacturing process used to make that portion of the wheel that contacts the ground. Various manufacturers provide wheels having not only different shapes and sizes, but also have different wheel cores having different configurations, sizes and apertures/openings into which lugs of a wheel mount fit to thereby mount the wheels. Various manufacturers make proprietary wheels having various proprietary wheel core contours or configurations. For example, a wheel core may have a plurality of circular apertures or non-circular apertures or apertures with ribs, or any other type of configuration into which lugs of a wheel mount fit into. Accordingly, lugs on wheel mounts for use with such wheel cores are limited to being specifically and complementarily sized and shaped so as to fit into one specific wheel core. In order for a user to utilize different wheels having different wheel core configurations, it is required that the user have a specific wheel mount for each type of wheel. That is, to change between wheels having different wheel core configurations requires that a user utilize a different wheel mount having lugs that are shaped and are specific to the particular lug aperture/contours of a particular wheel core.

Therefore, there is a need for a wheel mount for a personal vehicle that is not limited for use with one a specific wheel core having a specific wheel core configuration, but rather can be utilized with wheels having different wheel core configurations. There is a further need for a wheel mount for a personal vehicle having lugs shaped to provide for the mounting and use of various wheels irrespective of their wheel core apertures to thus obviate the need and limitation of utilizing wheel-specific wheel mounts.

Various aspects of the personal vehicle wheel mount disclosed herein addresses these needs. In particular examples, the wheel mounts are for a skateboard or scooter, and more particularly for a motorized skateboard or scooter, as discussed below.

SUMMARY

In one aspect a wheel mount, such as a skateboard wheel mount, is provided that has a base and a plurality of first lugs projecting from the base and having a first shape. In addition, a plurality of second lugs projecting from the base is provided, having a second shape different from the first shape, where the plurality of first lugs and plurality of second lugs are arranged to enable interchangeable mounting of a first wheel having a first wheel core, and a second wheel having a second wheel core different from the first wheel core.

In another aspect, the present disclosure describes a wheel mount for use with wheels for a personal vehicle, for example a skateboard or a scooter. In some embodiments, the wheel mount is for use with wheels for a motorized skateboard. In particular embodiments, the wheel mount disclosed herein includes a belt engagement portion for use with a belt of a belt drive motor. In still other embodiments, the wheel mount of the present disclosure has a direct drive engagement portion for fitting directly into a motor engagement portion.

In one embodiment, the first shape of first lugs projecting from the base has two planar surfaces and a first arcuate surface having a first arc length. In another aspect, the first shape has a first arcuate surface having a first arc length, and the second shape has a second arcuate surface having a second arc length, the first arc length being longer than the second arc length.

In still another aspect a wheel mount, such as a skateboard wheel mount according to the present disclosure, further comprises a first lug group that includes at least one lug of the plurality of first lugs and at least one lug of the plurality of second lugs, and a second lug group includes least one lug of the plurality of first lugs and at least one lug of the plurality of second lugs. The base can be provided with an axle aperture and where the first lug group and the second lug group are disposed adjacent the axle aperture. In particular embodiments, the first lug group and the second lug group are mirroredly disposed about the axle aperture. As one example, the first lug group and the second lug group are disposed along an annular region of the base.

In another exemplary embodiment, a skateboard wheel mount herein disclosed can have a first lug group that includes two of the first lugs and two of the second lugs, the first lugs and second lugs having different shapes. In yet even further embodiments, two of the second lugs are disposed between two of the first lugs within a lug group.

In yet another embodiment, a skateboard wheel mount is provided including a base having a belt engagement surface and an axle aperture through the base. The skateboard wheel mount further includes a plurality of first lugs depending from the base and having a first shape and a plurality of second lugs depending from the base and having a second shape different from the first shape. Here, the plurality of first lugs and plurality of second lugs are arranged to enable interchangeable mounting of a first wheel having a first wheel core, and a second wheel having a second wheel core different from the first wheel core. In particular embodiments the first shape has two planar surfaces and a first arcuate surface having a first arc length, and the second shape has two planar surfaces and a second arcuate surface having a second arc length, wherein the first arc length is different from the second arc length. In still yet another aspect, the skateboard wheel mount can further comprise a first lug group that includes at least one lug of the plurality of first lugs and at least one lug of the plurality of second lugs, and a second lug group includes least one lug of the plurality of first lugs and at least one lug of the plurality of second lugs.

In one exemplary configuration of lug groups provided in accordance with the teachings of the present disclosure, a first lug group and a second lug group are provided spaced apart from each other by about 72 degrees along the annular region. In another exemplary embodiment and in accordance with the present disclosure, the individual lugs within the first lug group are spaced apart from one another by about 36 degrees along the annular region. In additional embodiments individual lugs within the second lug group are also spaced apart from one another by about 36 degrees along the annular region are also provided. In yet another aspect, embodiments whereby the first lug group and the second lug group are spaced apart from each other by about 72 degrees along the annular region are also herein disclosed. Various embodiments of the wheel mount herein disclosed, such as a skateboard wheel mount, can further include a belt engagement surface that is a toothed surface (that is, having teeth).

In still yet a further aspect, a skateboard conversion kit is herein provided that includes skateboard wheel mount that has a base, a belt engagement surface, a plurality of first lugs projecting from the base and having a first shape and a plurality of second lugs projecting from the base and having a second shape different from the first shape and where the plurality of first lugs and plurality of second lugs are arranged to enable interchangeable mounting of wheels having different wheel core configurations. As one example, lugs of the wheel mount as disclosed herein enable mounting of wheels having wheel cores differing in number and/or shapes of wheel core apertures to the same wheel mount. The kit can include a belt for engagement with the belt engagement surface; and optionally, further include at least one of a wheel bearing, a motor cover and motor pulley.

Wheel mounts made in accordance to the teachings of the present disclosure can be made from any suitable material, such as a metal, a polymer, a ceramic and a composite.

Skateboard wheel mounts provided in accordance with the teachings of the present disclosure can have lugs arranged and configured to engage a first wheel core having circular apertures in addition to different wheels core, such as wheel cores having non-circular apertures, and/or apertures that are non-circular and having at least one rib. Exemplary wheel cores can have ten circular apertures. In particular embodiments, the skateboard wheel mount can be provided with first lugs that are arranged and configured to engage at least four of the ten circular apertures, while in particular embodiments more lugs may be provided. Specific embodiments are disclosed herein that provide for engagement with eight out of ten circular apertures as well as with non-circular ones of different wheel cores.

Embodiments of a skateboard wheel mount can include a base and a belt engagement surface. An exemplary belt engagement surface can be a toothed surface for engagement with a belt of a belt drive having itself a corresponding toothed surface. In specific embodiments, the skateboard wheel mount herein provided can have a toothed surface that has 56 teeth, 63 teeth, 68 teeth, 70 teeth or 75 teeth, for example.

Other objects, advantages and novel features of the invention will become more apparent from the following detailed description when taken in conjunction with the attached drawings.

BRIEF DESCRIPTION OF DRAWINGS

The above and further advantages of this disclosure may be better understood by referring to the following description in conjunction with the accompanying drawings, in which like numerals indicate like structural elements and features in various figures. The drawings are not necessarily to scale, emphasis instead being placed upon illustrating the principles herein described and provided by exemplary embodiments of the invention.

DETAILED DESCRIPTION

The present disclosure provides a personal vehicle wheel mount that, by its disclosed features, is compatible for use with different wheels having wheel cores that are different from each other. More particularly, the personal vehicle wheel mount disclosed herein has lugs of differing shapes that provide the inventive personal vehicle wheel mount with compatibility across multiple wheel core types/configurations, as discussed utilizing the non-limiting examples below.

The detailed description set forth below in connection with the appended drawings is intended as a description of the concepts and teachings of the instant disclosure and is not meant to be limiting. Exemplary personal vehicle wheel mount configurations, geometries and associated methods of use and exemplary methods/steps of manufacturing, as well kits that include one or more personal vehicle wheel mounts provided in accordance with the teachings of the present disclosure are herein disclosed. Thus, the invention is not limited to only such exemplary teachings and/or configurations. Particular embodiments of the personal vehicle wheel mount herein disclosed may be utilized with belt-drive motors and thus may be referred to as a type of wheel pulley, as wheel mounts used with belts in the motorized skateboarding art are typically called. Wheel mounts that do not utilize a belt and are directly mounted to a motor are typically called wheel core adapters in the motorized skateboarding art. It is further understood that the use of relational terms such as first, second, distal, proximal, and the like are used solely to distinguish one from another entity without necessarily requiring or implying any actual such relationship or order between such entities.

Referring more specially to the appended drawings, for illustrative purposes embodiments of the personal vehicle wheel mount 10, useful in personal vehicles, are more completely set forth in FIGS. 1-14.

Figure 1:
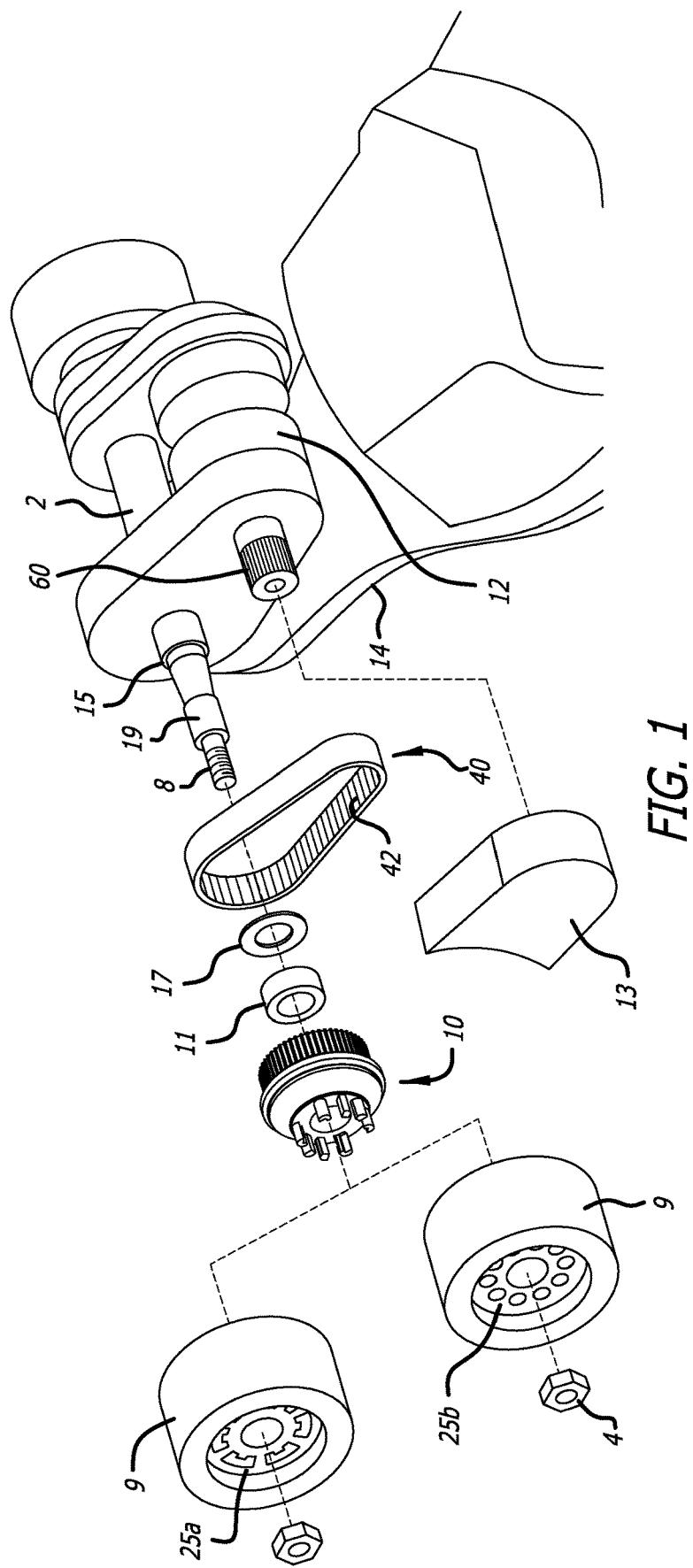
FIG. 1 is an exploded view of a rear portion of a motorized skateboard assembly, including two alternative skateboard wheel types, and an exemplary embodiment of a skateboard wheel mount in accordance with the present disclosure.

Now turning to FIG. 1, there is shown an exploded view of a rear portion of a motorized skateboard assembly, including a hanger 2, two alternative skateboard wheel types having different wheel cores 25a and 25b with differently configured apertures. In the art, wheels with a wheel core having non-circular apertures, as depicted by wheel core 25a, are generally referred to as "ABEC" wheels (ABEC 11 of Huntington Beach, Calif.). Such wheels can come in a variety of sizes such as 66 mm, 83 mm, 107 mm and others and can vary in hardness. In the art, wheels with a wheel core having circular apertures, as depicted by wheel core 25b, are generally referred to as "Kegel" wheels (Orangatang Wheels of Culver City, Calif.). Exemplary "Kegel" wheels for longboards can have diameters of 80 mm, widths of 56 mm and a contact patch of 56 mm and vary in hardness (for example, 77a, 80a or 83a) and have cores made of high-strength, high-stiffness and heat-resistant urethane. They are typically provided with a plurality of circular apertures, typically ten.

FIG. 1 further shows an exemplary embodiment of a personal vehicle wheel mount, here shown as a skateboard wheel mount 10 in accordance with the present disclosure. In this view, several components are shown that can be included in a conversion kit that is provided in accordance with the teachings of the present disclosure. Additional parts of the assembly include an axle nut 4 for securing a wheel 9 and skateboard wheel mount 10 to axle 8. Axle 8 can have a threaded end portion as shown in FIG. 1. A typical axle nut 4 size can be about 13 mm or 0.5 inches, although nut size can be different to comport with the size of the axle that it is threaded onto. Axle nut 4 can be a lock nut, such as a nylon lock nut, for example, that resists loosening under vibrations and torque. Such elastic stop nuts are of a particular type where some portion of the nut deforms elastically to provide a locking action. Further components of the assembly can include a bearing 11 that sits within skateboard wheel mount 10. While a single bearing 11 is shown in FIG. 1, two bearings may be provided in particular configurations. Such use of multiple bearings may result in foregoing the use of spacer 19, typically provided from the factory on electric motorized skateboards. A bearing spacer 17 (washer) is also shown that abuts shoulder 15.

As this exemplary motorized skateboard 14 has a motor 12 that utilizes a belt drive, a motor pulley 60 is utilized as shown. Motor pulley 60 can have a toothed surface for engaging belt 40. Exemplary belt 40 has an inner belt surface 42 that is toothed in order to engage with motor pulley 60 and a belt engagement portion 26 of skateboard wheel mount 10, as discussed further below. In addition, motor cover 13 is also shown. Motor cover 13 may be provided in a kit in accordance with the teachings of the instance disclosure, where motor cover 13 provided in the kit is smaller than a factory provided motor cover, as wheels mounted utilizing the exemplary skateboard wheel mount 10 may be bigger than factory wheels and as such the factory provided motor cover would no longer fit, being in the way of wheel 9 surface. Methods for mounting a replacement motor cover 13 as provided in a disclosed kit in accordance with one aspect of the instant disclosure, may utilize a similar mounting configurations (having, for example holes and fasteners, such as screws or bolts) as the factory cover, the replacement motor cover 13 of the kit being overall smaller than a factory provided one.

Belt 40, which may be provided as part of a kit as herein disclosed, can be a larger belt than the belt typically provided by the factory on an electric motorized skateboard. Factory provided belts are typically about 225 millimeters (mm) in length and about 15 mm in width, having 75 teeth, such as those designated as 225-3M-15. The majority of belt driven skateboards use Gates Inc. 3M and 5M HTD (High Torque Drive) timing belt profiles. Commonly utilized belts include 225-3M-15 for 80-85 mm wheels on stock/factory boosted boards. Larger diameter wheels and their large diameter wheel mounts (wheel pulleys) require larger/longer belts. As non-limiting examples, 243-3M-15 belts can be matched to 68 toothed wheel mounts/wheel pulleys with 97 mm wheels; 258-3M-15 belts can be match for use with wheel mounts/wheel pulleys having 75 teeth and 107 mm wheels. Belt 40 can be provided along with skateboard wheel mount 10 in a kit having a size of similar to or different from, a factory provided belt.

Figure 2:
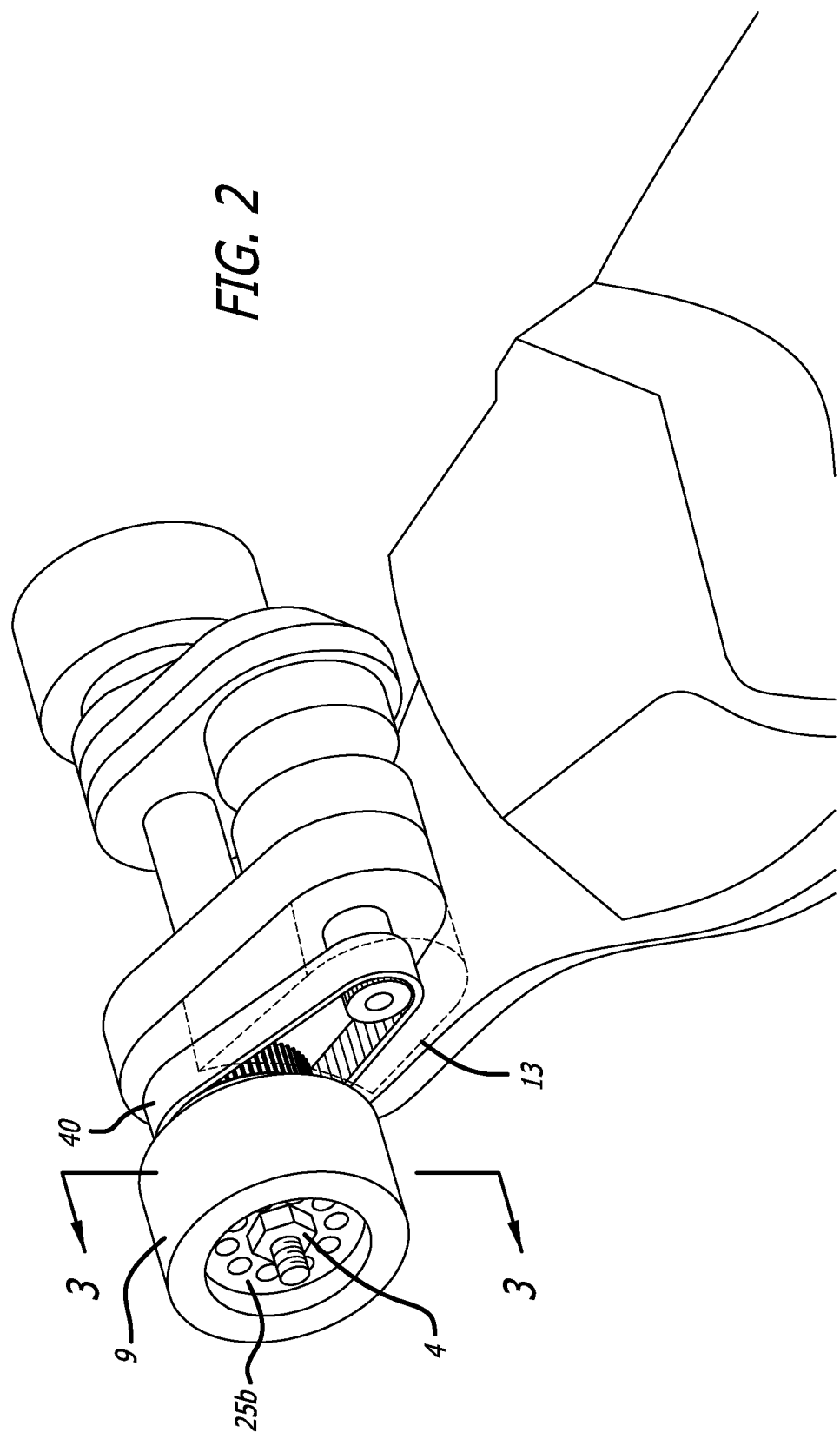
FIG. 2 is a perspective view of the skateboard assembly of FIG. 1, shown in an assembled condition.

FIG. 2 is a perspective view of the skateboard assembly of FIG. 1, shown in an assembled condition having motor cover 13 shown in ghost lines so that belt 40 can be seen engaging a belt engagement portion 26 of skateboard wheel mount 10 as well as motor pulley 60. In this exemplary view, a wheel 9 is illustrated having a wheel core 25*b* that features circular apertures. It is noted that wheel 9 having an exemplary wheel core 25*b* is shown in FIG. 2 for illustrative purposes and that any wheel 9 having a wheel core compatible with skateboard wheel mount 10 as herein described may be so mounted, including wheel 9 having an exemplary wheel core 25*a*.

Figure 3A:
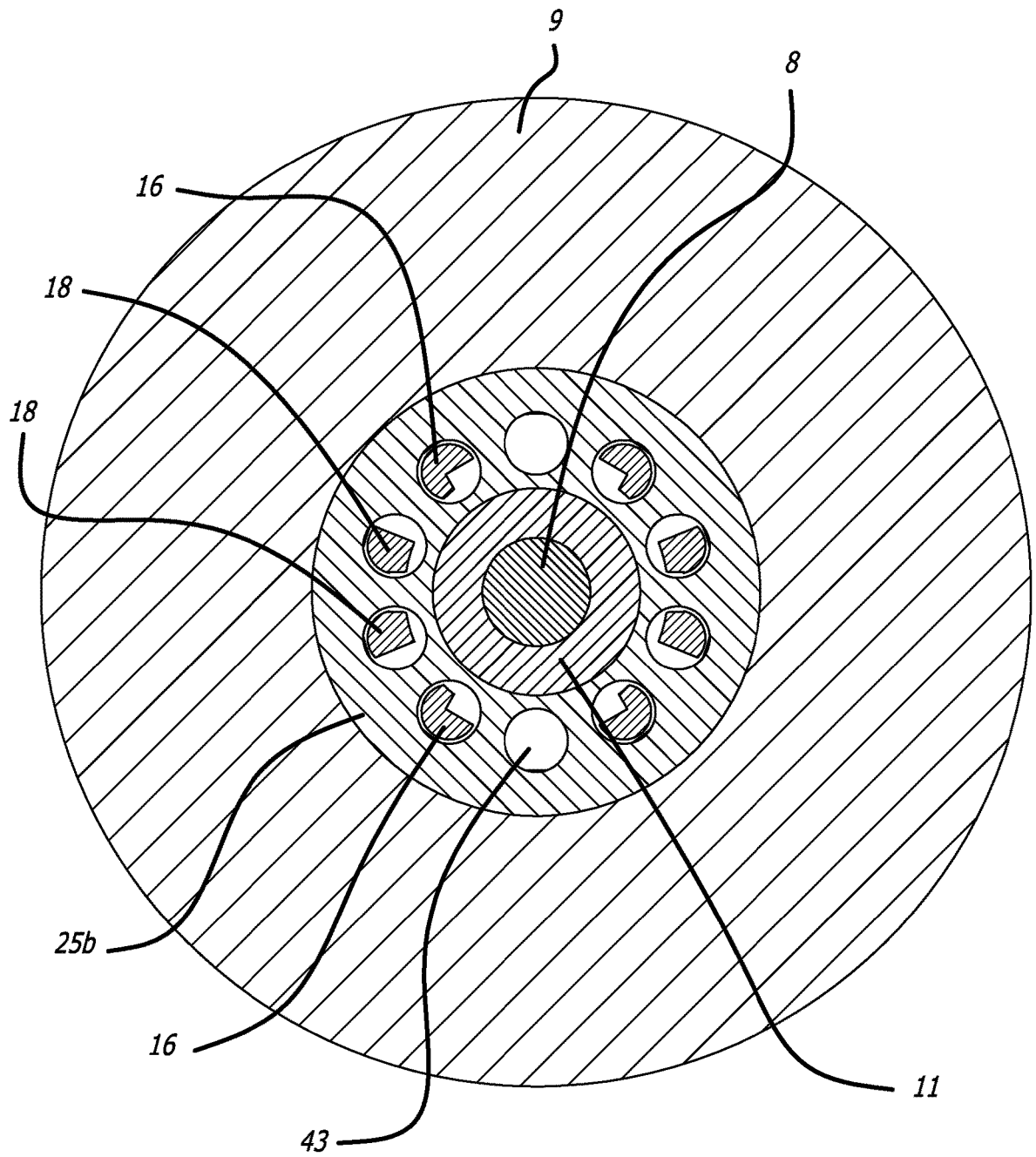
FIG. 3A shows a cross-sectional view of one of the two alternative skateboard wheels as engaged to the exemplary wheel mount, as taken along lines 3-3 of FIG. 2.

FIG. 3A shows a cross-sectional view of a skateboard wheel having a wheel core 25*b* that features circular apertures as engaged to an exemplary skateboard wheel mount 10, taken along lines 3-3 of FIG. 2. Centrally shown is a cross-section of axle 8 and bearing 11. Also shown in cross section, exemplary wheel 9 has a wheel core 25*b* that has several apertures (only one aperture 43 being labeled here for clarity purposes). In this example, there are provided ten apertures circularly and evenly spaced apart, each aperture 43 having a circular contour. While in this example wheel core 25*b* has ten apertures 43, wheel core 25*b* may have more or less apertures. Additionally, a first plurality of lugs 16 and a second plurality of lugs 18 that project from a base 20 are shown in cross-section here. The plurality of first lugs 16 have a first shape and the plurality of second lugs 18 have a second shape that is different than the first shape. In this example, the lugs engage eight of the ten apertures of wheel core 25*b*, or 80% of the apertures of the wheel core.

Figure 3B:
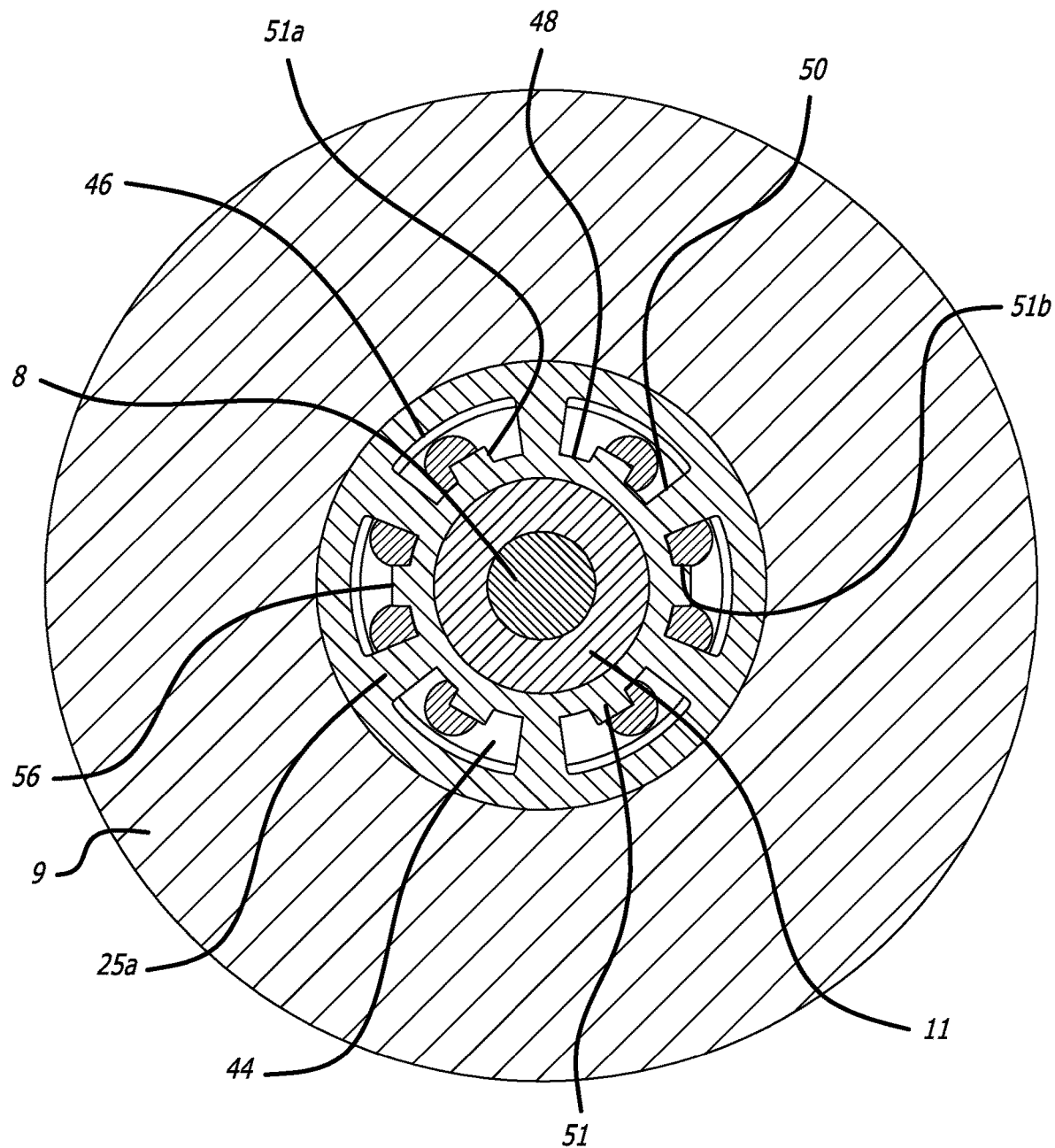
FIG. 3B shows a cross-sectional view of the other of the two alternative skateboard wheels as engaged to the exemplary wheel mount, as taken along lines 3-3 of FIG. 2.

Moving on to FIG. 3B, a cross-sectional view of a skateboard wheel having a wheel core 25*a* that features non-circular apertures as engaged to an exemplary skateboard wheel mount 10, this cross-sectional view is similar to the one taken along lines 3-3 of FIG. 2 for wheel 9 having a wheel core 25*b*. Such non-circular apertures may be of any useful contour, exemplary ones being seen in wheel 9 having wheel core 25*a* of FIG. 1, which is herein shown in cross-section in FIG. 3B, mounted to an exemplary skateboard wheel mount 10. As in FIG. 3A, axle 8 and bearing 11 are shown centrally located. Exemplary wheel core 25*a* is provided with non-circular aperture 44, six shown here. Non-circular aperture 44 can have a shape/contour resembling an annular sector and be repeated circularly, as shown, to provide a plurality of non-circular apertures 44. Accordingly, and in this example, non-circular aperture 44 can have an aperture side wall 50, aperture outer wall 46 having an arc length and aperture inner wall 48 disposed on either side of rib 51. Non-circular aperture 44 of wheel core 25*a* can also have a rib 51 having rib side walls 51*a* and 51*b*, as well as rib top wall 56. The same exemplary plurality of first lugs 16 having a first shape and exemplary plurality of second lugs 18 having a second shape different from the first shape shown in FIG. 3A are here shown how their novel surfaces and shapes engage with the inner contour/surfaces of non-circular apertures 44 to enable mounting and engagement with a wheel 9 having a wheel core 25*a* having non-circular apertures that are different than the apertures of wheel 9 in FIG. 3A having circular apertures. This novel interchangeability feature of the personal vehicle wheel mount of the instant disclosure is discussed further below.

Figure 4:
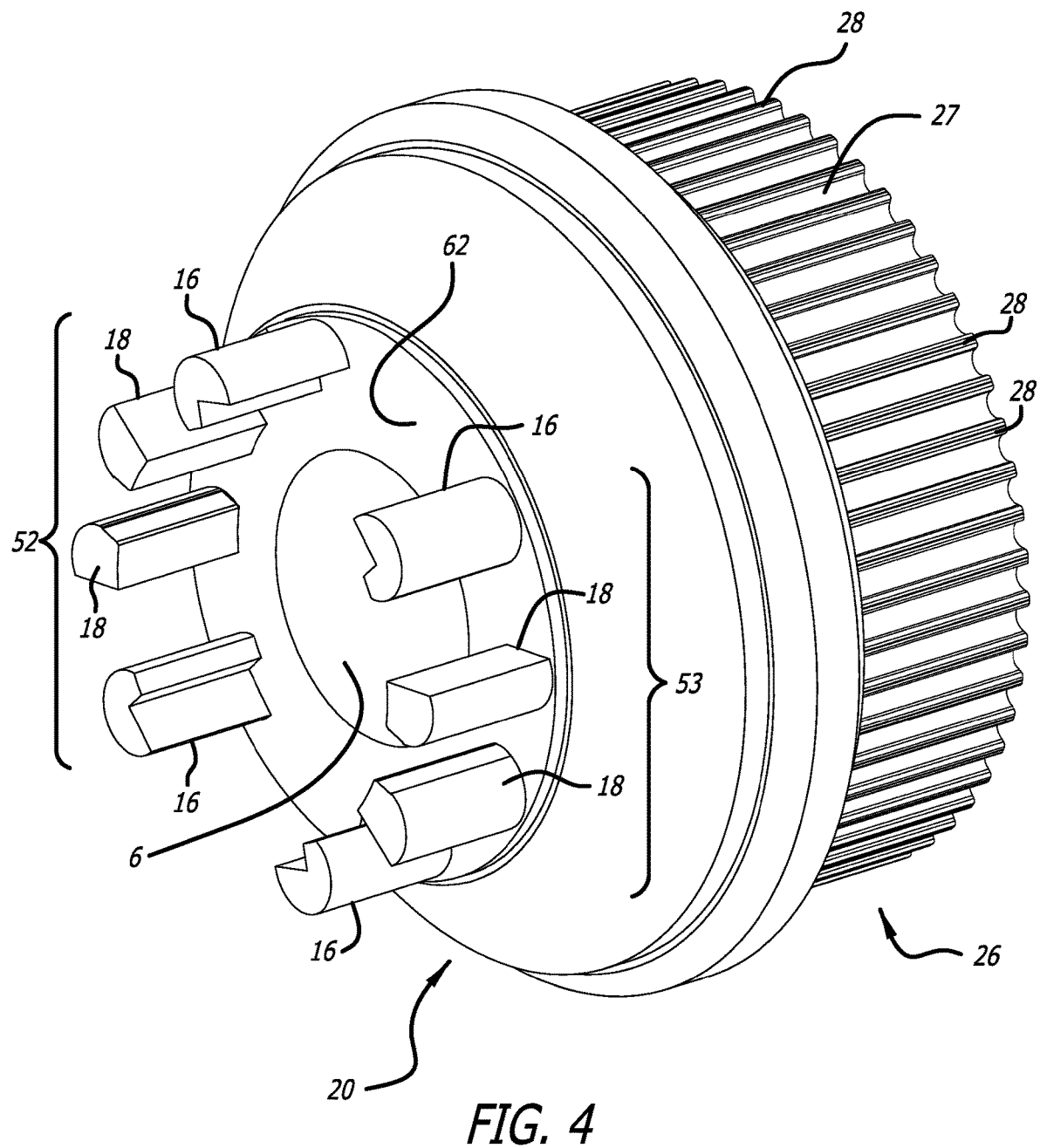
FIG. 4 is a perspective view of the wheel mount shown in FIG. 1.
Figure 5:
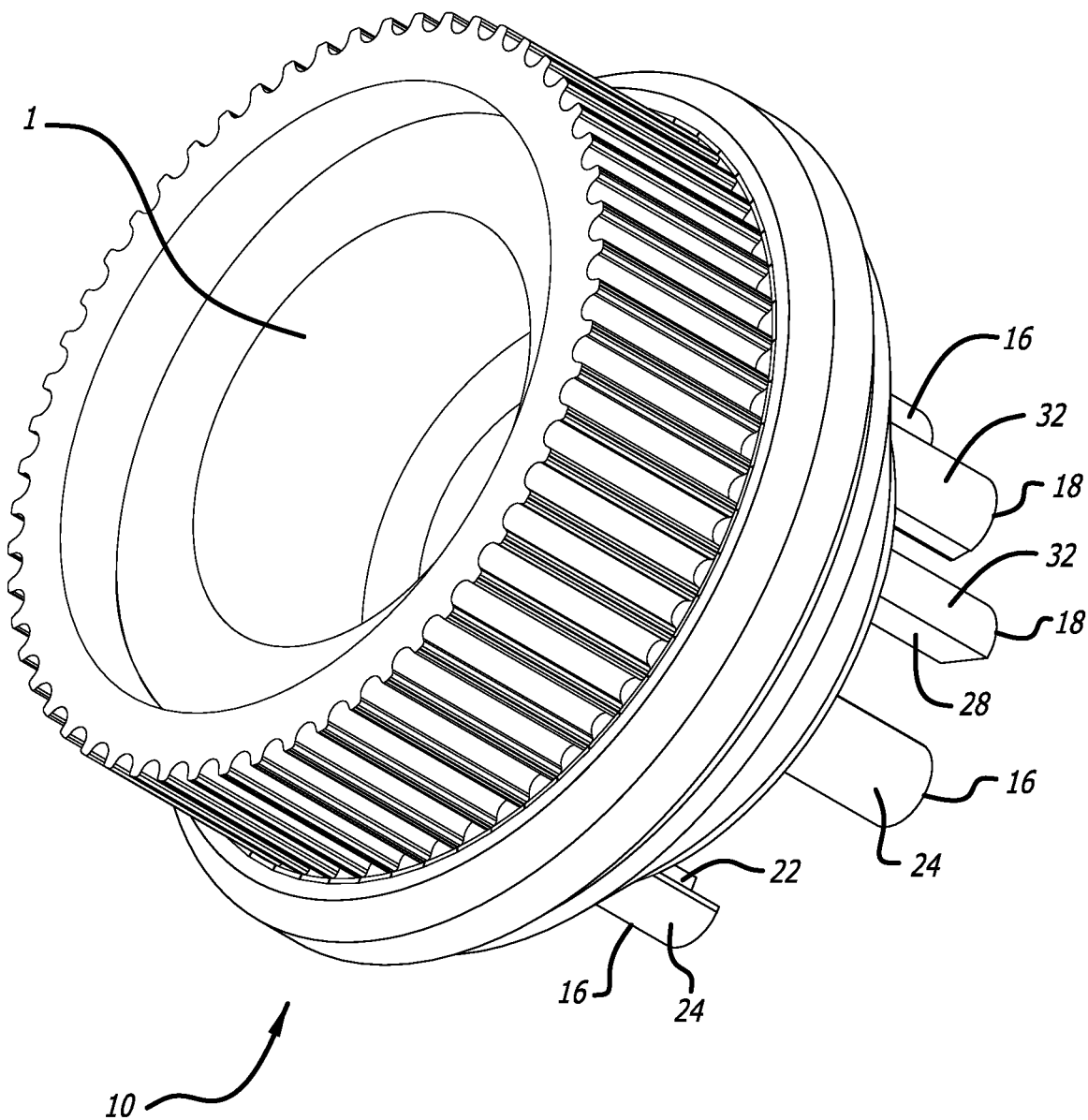
FIG. 5 is another perspective view of the wheel mount shown in FIG. 1.

The novel personal vehicle wheel mount 10 of the instant disclosure provides for interchangeability between wheels having different wheel core configurations. This feature arises because of the novel configuration, shape and arrangement of lugs of the personal vehicle wheel mount 10. Referring now to FIGS. 4 & 5, which show two different perspective views of the exemplary personal vehicle wheel mount 10 shown in FIG. 1, the personal vehicle wheel mount 10 shown can be utilized as a skateboard wheel mount. A base 20 is provided, from which a plurality of first lugs 16 projecting from the base and having a first shape and a plurality of second lugs 18 projecting from the base and having a second shape different from the first shape are provided. The first shape has a first arcuate surface 24 having a first arc length, and the second shape has a second arcuate surface 32 having a second arc length. In particular configurations the first arc length is longer than the second arc length. A bearing seat 1, is shown in FIG. 5 and provided for receiving at least one bearing 11. The lugs shown can project any useful distance from the base, and have a length of anywhere from 5 mm to 20 mm, for example, and preferably from about 8 mm to about 15 mm, more preferably from about 9 mm to about 12 mm or about 10 mm. First lugs 16 and second lugs 18 are typically provided projecting substantially outwardly and perpendicular to annular region 62 of base 20. Particular planar surfaces of lugs come together to define an angle of about 90 degrees, preferably 90 degrees.

The plurality of first lugs and plurality of second lugs are arranged to enable interchangeable mounting of a first wheel having a first wheel core, and a second wheel having a second wheel core different from the first wheel core. As shown in FIG. 4, a belt engagement portion 26 can be provided having a belt engagement surface 27. As shown here, belt engagement surface 27 can be a toothed surface having teeth 28. Belt engagement surface 27 can be provided having a tooth count of from about 50 teeth to about 200 teeth, from about 50 teeth to about 100 teeth, from about 50 teeth to about 80 teeth, from about 50 teeth to about 75 teeth, about 56 teeth, about 63 teeth, about 68 teeth, about 70 teeth, about 75 teeth, 56 teeth, 63 teeth, 68 teeth, 70 teeth or about 75 teeth. Most personal vehicle wheel mounts, such as electric skateboard wheel pulleys, utilize Gates High Torque tooth profiles having a 3M or 5M profile. Gates High torque profiles are preferred, although other profiles may be utilized. Electric motorized skateboards provided by Boosted (formerly Boosted Boards) of Mountain View, Calif., utilize a 3M profile while other manufacturers use a 5M profile. The 3M and 5M designations refer to 3 mm and 5 mm tooth pitches, i.e., to the center-to-center distance between the center of one tooth of the belt engagement surface 27 to the center of the adjacent tooth. In addition, base 20 has an axle aperture 6 that passes through and is sized to receive axle 8.

Figure 6:
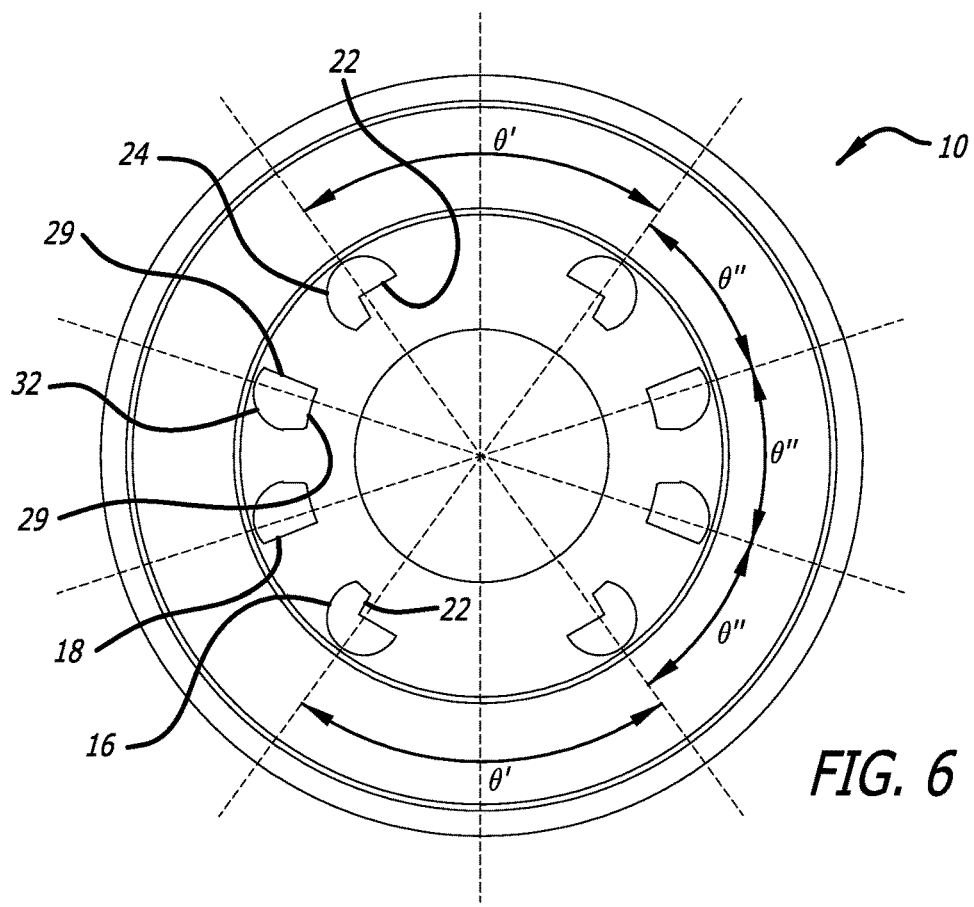
FIG. 6 is a left view of the wheel mount shown in FIG. 1.

Furthermore, and in this embodiment, a first lug group 52 and a second lug group 53 are provided. Generally, first lug group 52 and second lug group 53 are disposed along annular region 62 of base 20. The first lug group 52 includes at least one lug 16 of the plurality of first lugs and at least one lug 18 of the plurality of second lugs, and second lug group 53 includes least one lug 16 of the plurality of first lugs and at least one lug 18 of the plurality of second lugs. The arc length of the circularly disposed lugs of a lug group (here, the curved distance from first lug 16 to second lug 16 of a lug group) is about 40 mm. Particular planar surfaces of lugs come together to define an angle of about 90 degrees, preferably 90 degrees. For example, exemplary lug 16 has first and second planar surfaces defining an angle which may be about 90 degrees, such as, e.g., about 80 degrees to about 100 degrees, whereas exemplary lug 18 has first and second planar surfaces defining another angle, which may be about 270 degrees, such as, e.g., about 260 degrees to about 280 degrees. Lugs can have a third planar surface defining another angle, as can be seen in FIG. 6. In particular embodiments, lugs 16 and 18 can have two planar surfaces that come together to define a reflex angle, that is, an angle of greater than 180 degrees and less than 360 degrees. As utilized here, all angles are taken to be measured outside of the shape of the lugs, that is, measured from the outer surface of one planar side, outside the lug and to the surface of another adjacent planar outer sides, not passing through the lug, i.e. are not internal angles. In particular embodiments, lug 16 and lug 18 can have at least two planar surfaces. In particular embodiments, any number of lug 16 and/or any number of lug 18 and any combination thereof, can have at least three planar surfaces. In a particular embodiment, every lug 16 and every lug 18 provided has three planar surfaces.

Referring again to FIGS. 4, 5 and now FIG. 6, which is a left view of the wheel mount shown in FIG. 1, the lugs of plurality of first lugs 16 projecting from the base can have a first shape that includes two planar surfaces 22 and a first arcuate surface 24. Base 20 has an axle aperture 6 and the first lug group 52 and the second lug group 53 are disposed adjacent the axle aperture 6. In the particular embodiment shown in FIGS. 4, 5 & 6, the first lug group 52 and the second lug group 52 are mirroredly disposed about the axle aperture 6. In one embodiment, first lug group 52 includes at least two of first lug 16 and at least two of second lug 18. As shown in the embodiment of FIGS. 4, 5 & 6, two of second lugs 18 are disposed between two of first lugs 16.

Referring to FIG. 6, an exemplary arrangement of differently shaped lugs that may be utilized with different wheels having different wheels cores is illustrated. The dashed lines are provided for reference and are substantially about 36 degrees apart. Accordingly, a plurality of first lugs 16 and a plurality of second lugs 18 are shown, provided as a first lug group 52 and second lug group 53, as described in FIG. 4. As previously described, first lugs 16 have a first shape and are provide in accordance with the teachings of the present disclosure to have a first shape planar surface 22 and a first arcuate surface 24 having a first arc length, whereas second lugs 18 are disclosed to have a second shape that different for the first shape and have at least one second shape planar surface 18 and second arcuate surface 32. In particular embodiments and as shown here, second arcuate surface 32 has an arch length that is different that the first arc length of the first arcuate surface 24. As shown in FIG. 6, first lug group 52 (lugs shown on the left) and second lug group 53 (lugs shown on the right) are spaced apart from each other at angle θ', here at about 72 degrees along the annular region.

Furthermore lugs, within second lug group 53 are spaced apart from each other at angle θ", here at about 36 degrees along the annular region 62. Similarly, lugs of first lug group 52 are spaced apart from each other at angle θ", here at about 36 degrees along the annular region 62.

Figure 7:
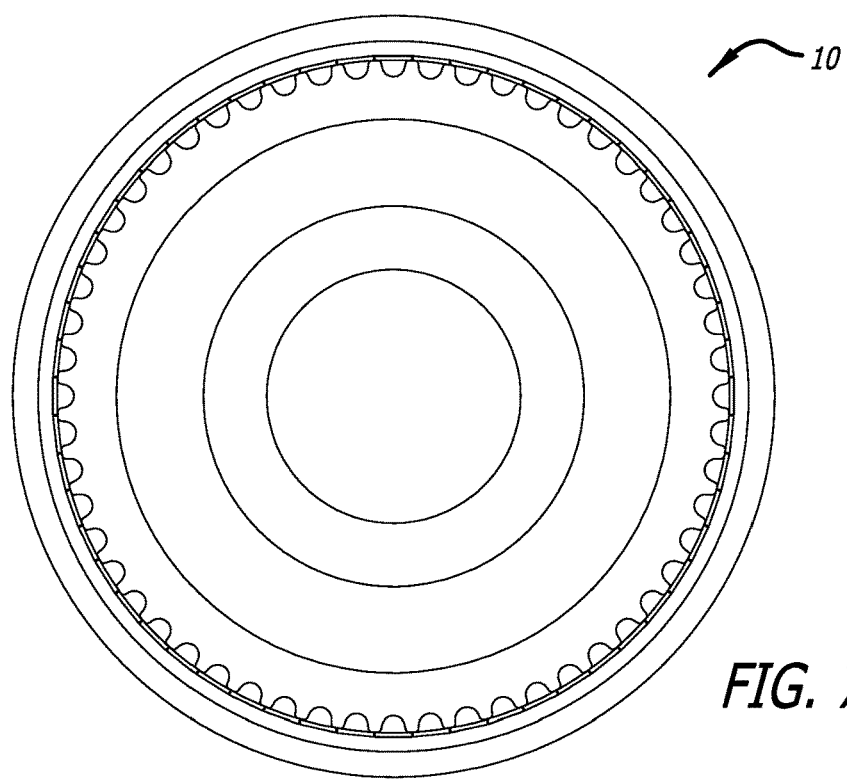
FIG. 7 is a right view of the wheel mount shown in FIG. 1.
Figure 8:
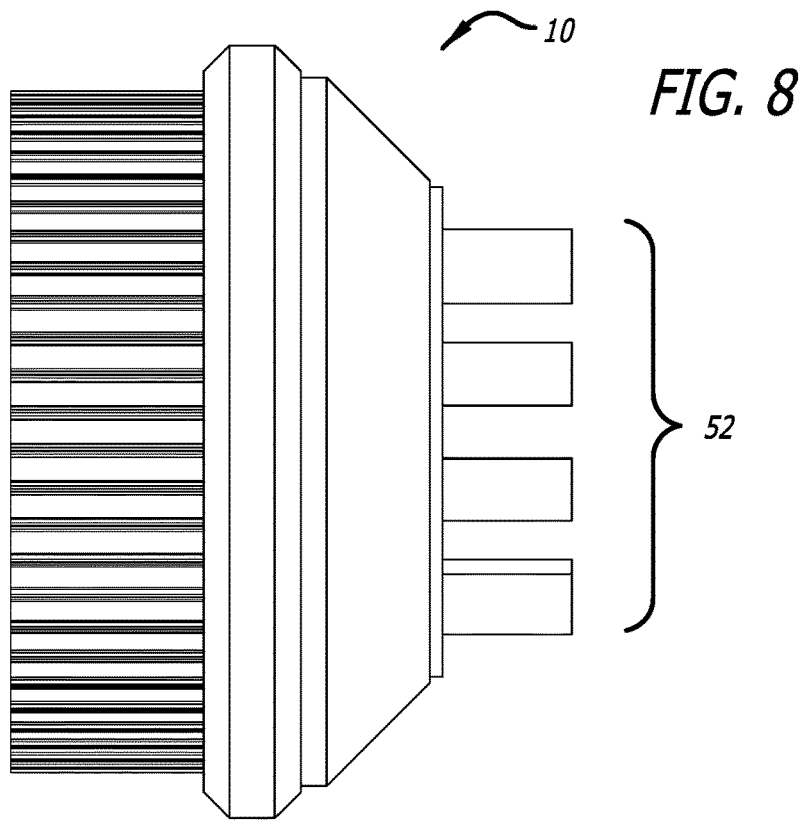
FIG. 8 is a rear view of the wheel mount shown in FIG. 1.
Figure 9:
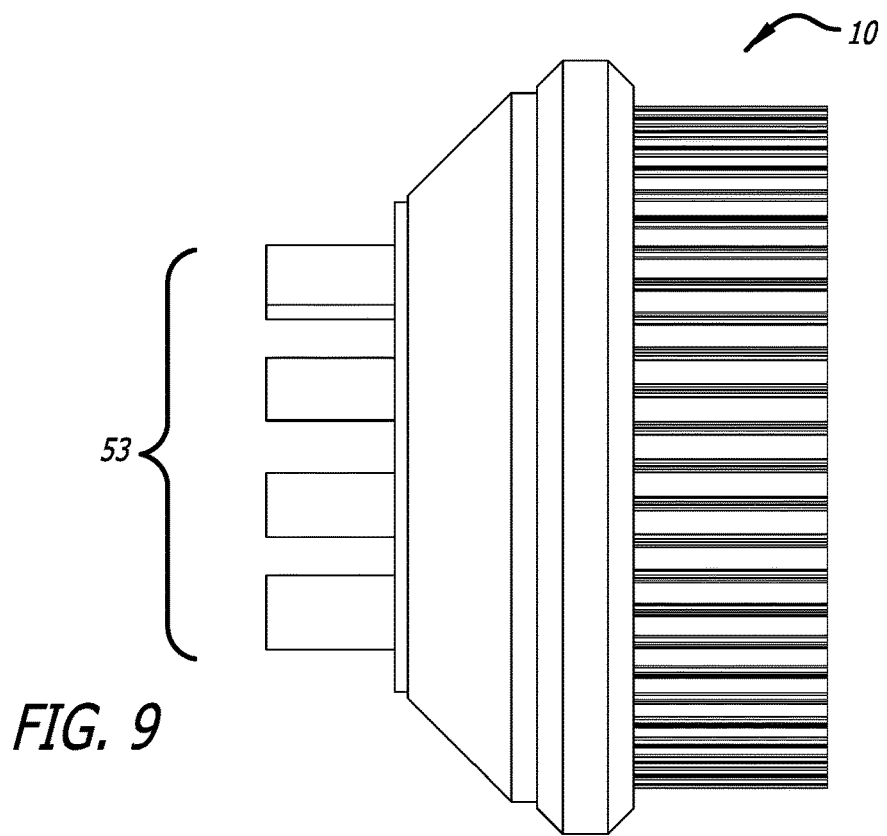
FIG. 9 is a front view of the wheel mount shown in FIG. 1.
Figure 10:
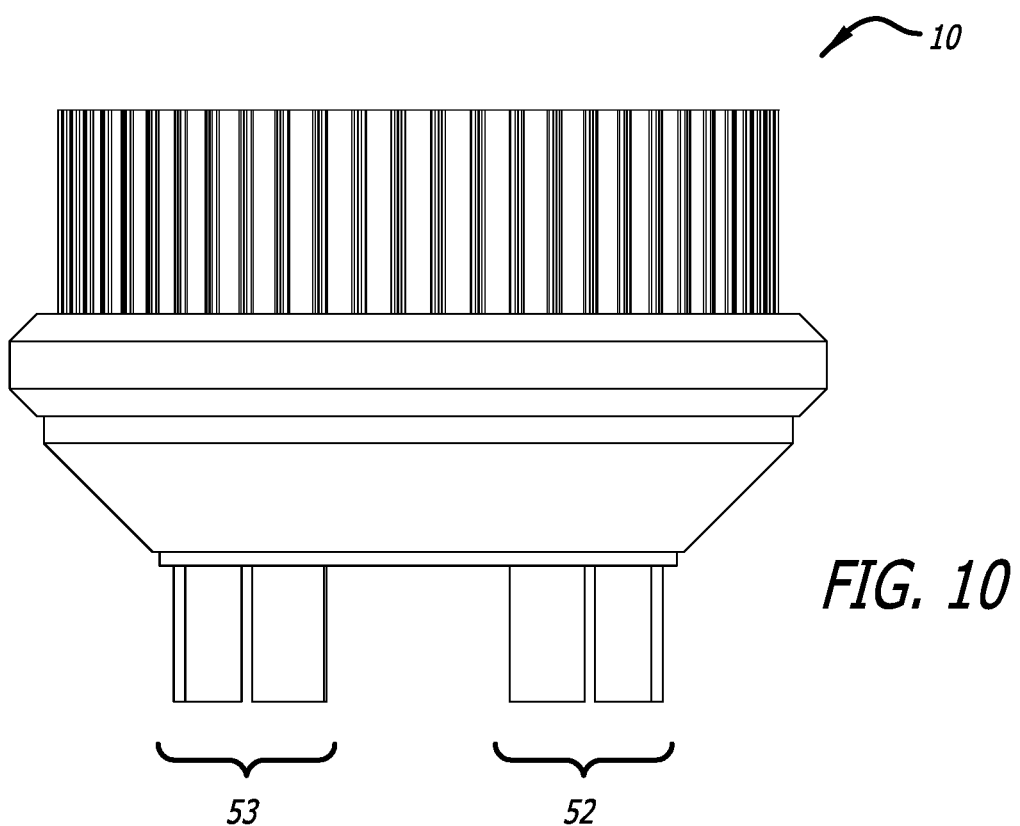
FIG. 10 is a top view of the wheel mount shown in FIG. 1.
Figure 11:
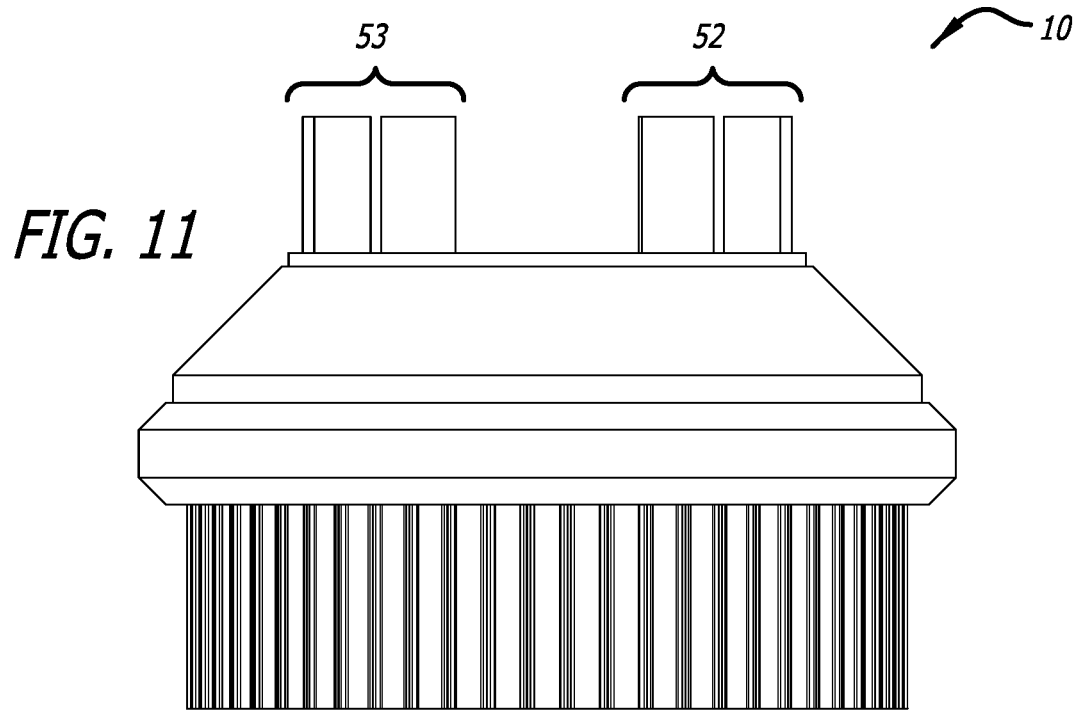
FIG. 11 is a bottom view of the wheel mount shown in FIG. 1.

FIG. 7 is a right view of the wheel mount shown in FIG. 1; FIG. 8 is a rear view of the wheel mount shown in FIG. 1; FIG. 9 is a front view of the wheel mount shown in FIG. 1; FIG. 10 is a top view of the wheel mount shown in FIG. 1 and FIG. 11 is a bottom view of the wheel mount shown in FIG. 1.

In one aspect, the instant disclosure provides a method for utilizing the exemplary personal vehicle wheel mount 10 as disclosed herein, on a motorized skateboard. Such method steps are typically executed when utilizing parts in a conversion kit, as herein described, to replace the factory provided wheel pulley, belt and, optionally, wheels, with the personal vehicle wheel mount 10 of the instant disclosure. As mentioned previously, when having a belt engagement portion 26 that is toothed and utilized with a drive belt, personal vehicle wheel mount 10 can also be referred to as a skateboard wheel mount/wheel pulley. Method steps for mounting an exemplary personal vehicle wheel mount 10 as disclosed herein, and provided as part of a kit for example, includes the following steps. Firstly, and on the motorized skateboard, the factory wheel and wheel pulley are removed from the skateboard. This is achieved by first, removing wheel nut 4, and once removed, the wheel is rotated while putting gentle pressure to pull the wheel out, such that the belt does not bind. In one example, on motorized skateboards from Boosted boards, on Generation II (VII and VII+), a wheel spacer 19 is found. Wheel spacer 19, can be removed and not utilized further, if utilizing a second wheel bearing 11 that can be part of the kit. A bearing spacer 17 (washer) can also be removed and utilized in a later step. Next, the factory motor cover is removed utilizing, for example, a 3 mm hex key to remove fasteners (such as bolts) if so utilized to secure the motor cover, and then the belt and motor cover are removed. Next, loosen up motor bolts just enough to have the motor slide so as to be able to fit belt 40, which can be larger than a factory provided belt. Next, to install a new wheel (typically larger) and exemplary personal vehicle wheel mount 10 combo (wheel mounted onto lugs 16 and 18 of the personal vehicle wheel mount 10) as disclosed herein. Bearing spacer 17 (washer) is returned followed by bearing 11 (one or more). Kit belt 40, such as a 258-3M-15 belt which is for an exemplary personal vehicle wheel mount 10 having 75 teeth, is then looped over motor pulley 60 and axle. Wheel and personal vehicle wheel mount 10 assembly are then aligned and mounted onto the axle 8, looping belt 40 onto belt engagement portion 26 and keeping belt also looped onto motor pulley 60 while slowly turning the wheel and personal vehicle wheel mount 10 assembly to align teeth and grooves of motor pulley 60 and belt engagement portion 26 with inner belt surface 42 (also toothed). Next, motor bolts are to be tightened to secure motor at a position that provides for proper belt tension. This is achieved by now, replacing axle nut 4 onto the axle and tightening the wheel and personal vehicle wheel mount 10 assembly to the axle just finger tight (not tightening all the way, since motor position is still to be adjusted and secured). The loose motor is now pushed forward and toward the front of the board to achieve proper belt tension, after which the motor bolts are tightened to secure motor and maintain desired belt tension such that belt 40 flexes slightly under finger as known to those of ordinary skill in the art. Spin the newly mounted wheel a few times to ensure that there is no belt binding. Next, tighten fully axle nut 4 and then back off ⅛th to ¹⁄₁₆th of a turn. Lastly, mount kit provided motor cover 13 (such as a smaller than factory motor cover that comes with a 75 toothed personal vehicle wheel mount 10 of the instant disclosure).

Figure 12:
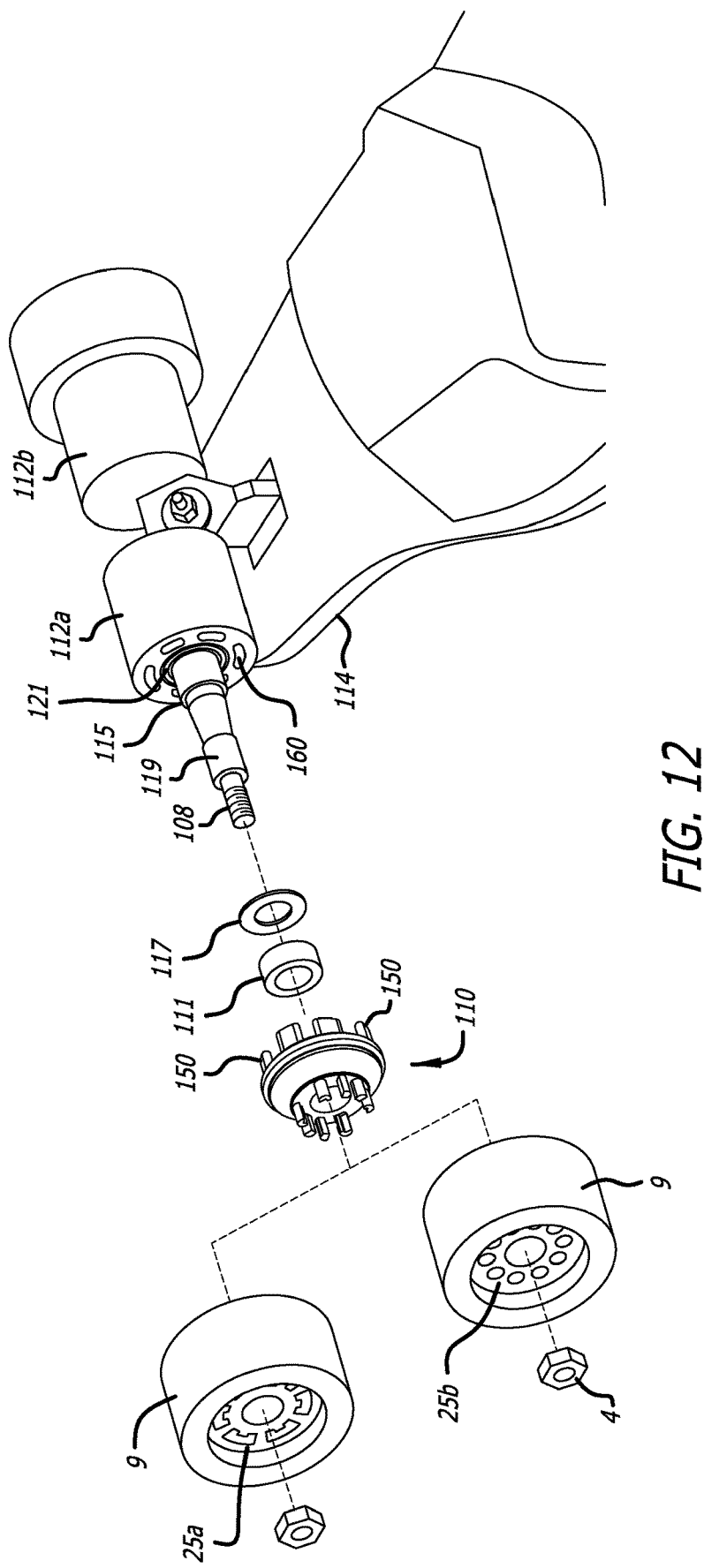
FIG. 12 an exploded view of a rear portion of another type of motorized skateboard assembly, including two alternative skateboard wheel types, and another exemplary embodiment of a skateboard wheel mount in accordance with the present disclosure.

Turning now to FIG. 12, an exploded view of a rear portion of another type of motorized skateboard assembly is provided, including two alternative skateboard wheel types, and another exemplary embodiment of a skateboard wheel mount 110 provided in accordance with the teachings of the present disclosure. Here skateboard wheel mount 110 is for use with wheels having differently configured wheel cores and with direct drive motors. A bearing 111 (or multiple bearings), spacer 119, shoulder 115, motorized skateboard 114, wheel mount spacer 117 and axle 108 are shown.

Exemplary direct drive motors 112a and 112b do not utilize a belt such as belt 40 shown in FIG. 1, but rather use a skateboard wheel mount 110 in direct engagement to the motor via direct drive engagement portions 150 of the skateboard wheel mount 110. Prior art wheel mounts for use with direct drive motor configurations are also known as wheel core adapters in the skateboarding art. Direct drive motors 112a are provided with motor engagement portions 160 with which direct drive engagement portions 150 engage, here exemplarily shown as tabs protruding from the base of a skateboard wheel mount 110 opposite the side having the inventive first and second plurality of lugs according to the teachings of the present disclosure.

Figure 13:
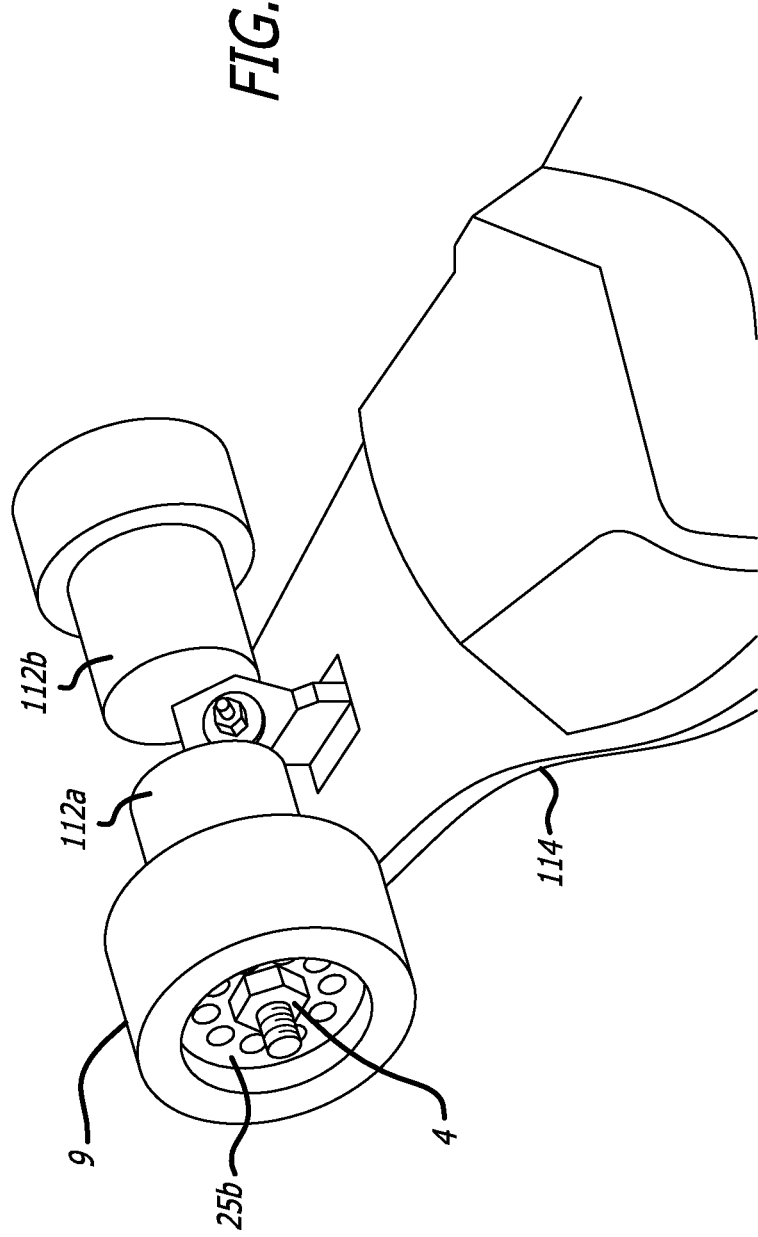
FIG. 13 is a perspective view of the skateboard assembly of FIG. 12, shown in an assembled condition.

Notably, lugs as previously described in the embodiments shown and discussed in FIGS. 4, 5 & 6, for example, can also be utilized on wheel mounts such as skateboard wheel mount 110 that lack a belt engagement portion and are utilized mounted directly to the motor 112. Examples of direct drive motors, as well as prior art wheel core adapters are commercially available at, e.g., DIY Electric Skateboard, San Francisco, Calif. By utilizing a skateboard wheel mount 110 having lugs in accordance with the teachings of the instant disclosure, users are now able mount wheels having different wheel core configurations (for example, the circular apertures of the wheel cores of "Kegel" wheels as well as the non-circular, annular sector contoured apertures of "ABEC" wheels) onto a single skateboard wheel mount 110 for use with direct drive motors. FIG. 13 is a perspective view of the skateboard assembly of FIG. 12, shown in an assembled condition.

Figure 14:
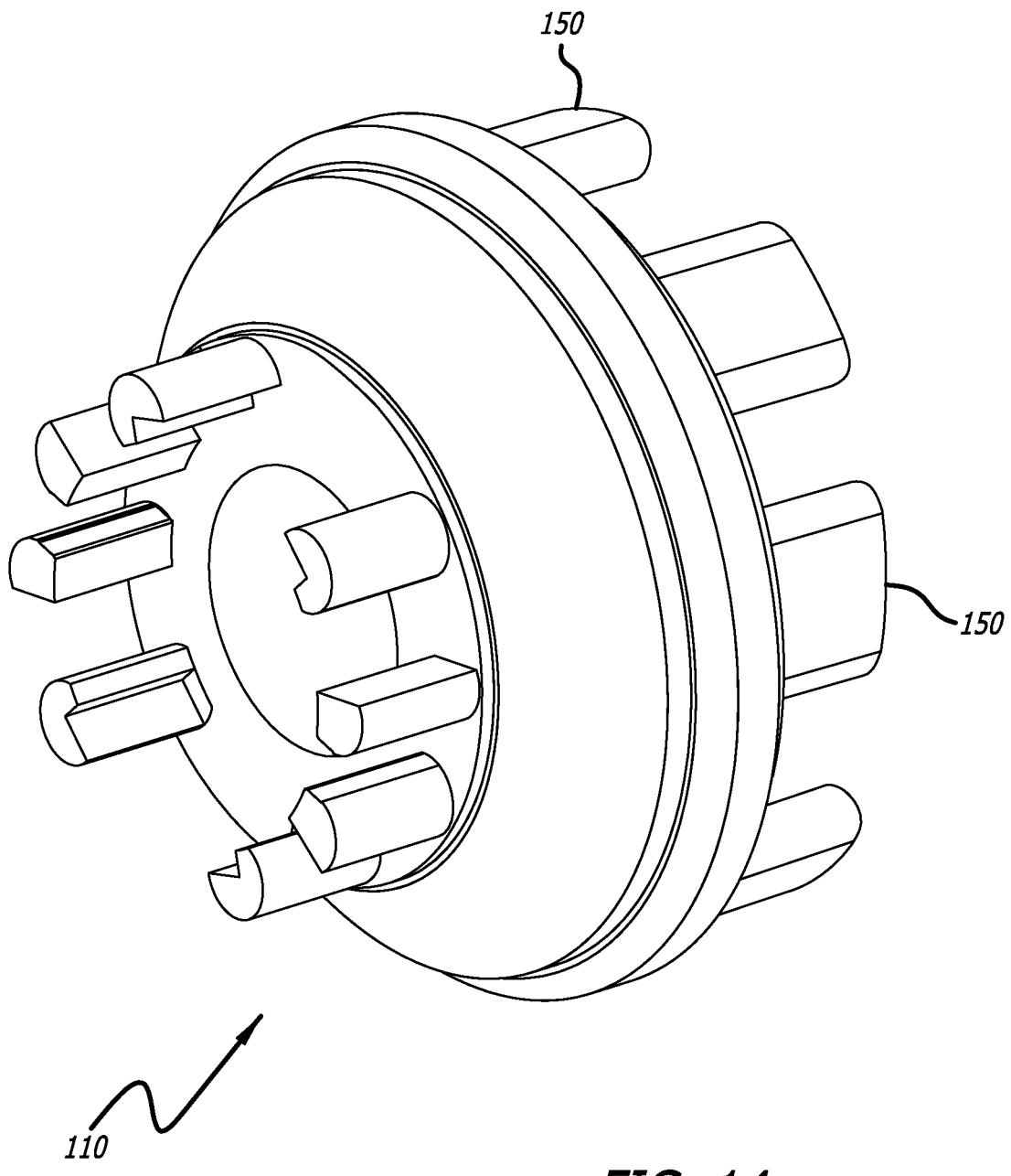
FIG. 14 is a perspective view of the exemplary wheel mount shown in FIG. 12.

FIG. 14 is a close-up perspective view of the exemplary wheel mount 110 shown in FIG. 12, provided in accordance with the teachings of the present disclosure.

Is noted that in one aspect, the wheel lug shapes, numbers and arrangements taught herein provide for a wheel mount having lugs of different shapes that are capable of engaging all apertures of a wheel core having a first number of apertures of a first shape. The same wheel mount is also capable of being mounted to another wheel having a differently configured wheel core and engaging less than all apertures of the different wheel core having a second particular number of apertures of a similar or second shape.

Further, as one example, the teachings herein provide a personal vehicle wheel mount having a configuration whereby a first plurality of lugs having a first shape and a second plurality of lugs having a second shape differentially engage a plurality of apertures of a single wheel core. As one example, in a wheel core having a plurality of apertures, particular apertures are engaged by a single lug and other apertures (which may be adjacent) are engaged by a plurality of lugs. FIG. 3B shows one such example. As another example, in a wheel core such as that shown in FIG. 3A, similarly shaped apertures are singly engaged by a single lug of the personal vehicle wheel mount, however and as shown, differently shaped lugs engage the wheel core apertures distinctively, that is, via particular surface geometries of the particular lugs provided in accordance with the present teachings.

The inventive wheel mounts disclosed herein may be made of any suitably resilient material such a metal, a polymer, a ceramic and a composite. Non-limiting examples include, but are not limited to, ferrous metals, carbon steel, tool steel (for example, having a carbon content between 0.5% and 1.5% and alloying elements that form carbides such as tungsten, chromium, vanadium and molybdenum), stainless steel, 6061 aluminum (a precipitation-hardened aluminum alloy, containing magnesium and silicon as its major alloying elements), DELRIN® (a thermoplastic acetal resin) and fiber reinforced nylon (such as reinforced with KEVLAR®, carbon fiber and fiberglass or any combination thereof, for example). Likewise, any suitable manufacturing method may be utilized to provide the inventive wheel mount in accordance with the instant disclosure. For example, novel personal vehicle wheel mounts of the instant disclosure can be made utilizing machining methods, casting methods, 3-D printing methods, milling or any combination of thereof.

In an exemplary manufacturing method, a billet of a metal or alloy, such as, and not limited to, aluminum 6061 or 7075, carbon steel, tool steel; copper, tin and zinc alloys such as brass and bronze; titanium alloys and nickel alloys, is provided and milled utilizing a CNC milling machine. In a first step is a machining step on a lathe utilizing "live tooling" endmills ranging from 0.25 inch in diameter to 0.0625 inch in diameter are used to make the personal vehicle wheel mount in accordance with the instant disclosure. The personal vehicle wheel mount, such as 10 and 110, can also be made utilizing 3, 4 and 5 axis CNC milling machines with appropriate standard tooling to achieve the desired shape, size and configurations in accordance with the teachings provided herein.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular, article, apparatus, methodology, or materials or methods described herein, unless expressly stated as such. In addition, those of ordinary skill in the art will recognize that certain changes, modifications, permutations, alterations, additions, subtractions and sub-combinations thereof can be made in accordance with the teachings herein disclosed without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein. Of course, variations on these described embodiments will become apparent to those of ordinary skill in the art upon reading the foregoing disclosures and teachings. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present disclosure.

Lastly, the terminology used herein is for the purpose of describing particular embodiments only and is not intended to limit the scope of the present invention, which is defined solely by the claims. Accordingly, the present invention is not limited to that precisely as shown and described.

The invention claimed is:

1. A skateboard wheel mount, comprising:
   a base, the base comprising a first side and an opposite second side, the first side having either a toothed belt engagement surface or a plurality of direct drive engagement portions, the first side further defining a bearing seat;
   a plurality of first lugs projecting from the second side of the base and having a first shape; and
   a plurality of second lugs projecting from the second side of the base and having a second shape different from the first shape; the plurality of first lugs and plurality of second lugs are arranged to enable interchangeable mounting of a first wheel having a first wheel core, and a second wheel having a second wheel core different from the first wheel core.

2. The skateboard wheel mount according to claim 1, wherein the first shape has two planar surfaces and a first arcuate surface having a first arc length.

3. The skateboard wheel mount of claim 1, the wherein the first shape has a first arcuate surface having a first arc length, and the second shape has a second arcuate surface having a second arc length, wherein the first arc length is longer than the second arc length.

4. The skateboard wheel mount according to claim 1, further comprising a first lug group that includes at least one lug of the plurality of first lugs and at least one lug of the plurality of second lugs, and a second lug group includes least one lug of the plurality of first lugs and at least one lug of the plurality of second lugs.

5. The skateboard wheel mount according to claim 4, wherein the base has an axle aperture and the first lug group and the second lug group are disposed adjacent the axle aperture.

6. The skateboard wheel mount according to claim 4, wherein the base has an axel aperture, and the first lug group and the second lug group are mirroredly disposed about the axle aperture.

7. The skateboard wheel mount of claim 4, wherein the first lug group and the second lug group are disposed along an annular region of the base.

8. The skateboard wheel mount of claim 4, wherein the first lug group includes two of said first lugs and two of said second lugs.

9. The skateboard wheel mount of claim 8, wherein the two of said second lugs are disposed between the two of said first lugs.

10. A skateboard wheel mount, comprising:
    a base including a first side and an opposite second side, the first side having either a belt engagement surface or a plurality of direct drive engagement portions, the first side further defining a bearing seat;
    an axle aperture through the base;
    a plurality of first lugs depending from the second side of the base and having a first shape; and
    a plurality of second lugs depending from the second side of the base and having a second shape different from the first shape, wherein the plurality of first lugs and plurality of second lugs are arranged to enable interchangeable mounting of a first wheel having a first wheel core, and a second wheel having a second wheel core different from the first wheel core.

11. The skateboard wheel mount of claim 10, wherein the first shape has two planar surfaces and a first arcuate surface having a first arc length, and the second shape has two planar surfaces and a second arcuate surface having a second arc length, wherein the first arc length is different from the second arc length.

12. The skateboard wheel mount of claim 11, further comprising a first lug group that includes at least one lug of the plurality of first lugs and at least one lug of the plurality of second lugs, and a second lug group includes least one lug of the plurality of first lugs and at least one lug of the plurality of second lugs.

13. The skateboard wheel mount of claim 12, wherein the first lug group and the second lug group are disposed along an annular region of the base.

14. The skateboard wheel mount of claim 13, wherein the first lug group and the second lug group are spaced apart from each other by about 72 degrees along the annular region.

15. The skateboard wheel mount of claim 13, wherein the lugs within the first lug group are spaced apart from one another by about 36 degrees along the annular region.

16. The skateboard wheel mount of claim 15, wherein the lugs within the second group are spaced apart from one another by about 36 degrees along the annular region.

17. The skateboard wheel mount of claim 16, wherein the first lug group and the second lug group are spaced apart from each other by about 72 degrees along the annular region.

18. The skateboard wheel mount of claim 10, wherein the belt engagement surface is a toothed surface.

19. A skateboard conversion kit comprising:
    a skateboard wheel mount having a base, the base comprising a first side and an opposite second side, the first side having a belt engagement surface, the first side further defining a bearing seat, a plurality of first lugs projecting from the second side of the base and having a first shape, and a plurality of second lugs projecting from the second side of the base and having a second shape different from the first shape;
    wherein the plurality of first lugs and plurality of second lugs are arranged to enable interchangeable mounting of a first wheel having a first wheel core, and a second wheel having a second wheel core different from the first wheel core; and a belt for engagement with the belt engagement surface.

20. The skateboard conversion kit of claim 19 wherein the skateboard wheel mount made is from a material selected from the group of materials consisting of a metal, a polymer, a ceramic and a composite.

21. The skateboard conversion kit of claim 19 further including at least one of a wheel bearing, a motor cover and motor pulley.

* * * * *